July 17, 1928.

E. L. NELSON

GLAZING BAR

Original Filed July 28, 1924

1,677,650

INVENTOR:
Elmer L. Nelson,
BY
Dyrenforth, Lee, Chritton & Wiles,
ATTORNEYS.

Patented July 17, 1928.

1,677,650

UNITED STATES PATENT OFFICE.

ELMER L. NELSON, OF CHICAGO, ILLINOIS.

GLAZING BAR.

Application filed July 28, 1924, Serial No. 728,604. Renewed December 19, 1927.

Figure 1:
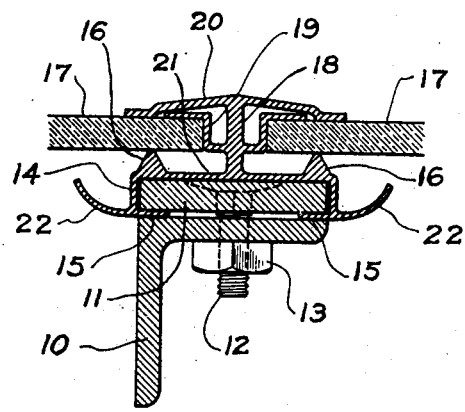
Figure 2:
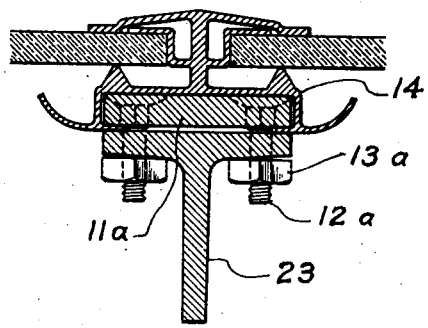

This invention relates to glazing bars and the like which are particularly adapted to be used for holding the glass of skylights. This invention is fully described in the following specification and shown in the accompanying drawings in which:

Figure 1 is a cross-sectional view of a glazing bar embodying the invention; and Fig. 2 is a similar view, showing a modified form of the same.

It will be understood that these glazing bars are used in skylights and the like where they are usually set with their length inclined to the horizontal so that water will readily drain off the glass.

Fig. 1 shows an angle iron 10 to which is secured a bar 11 by means of bolts 12 and nuts 13. About the bar 11 is folded a member 14 of lead or the like, which has lips 15 extending around and under the bar 11 so as to be gripped between this bar and the angle iron 10.

On the upper surface of the member 14 are two logitudinally disposed supports 16 adapted to receive the glass 17. Between these supports rises a central web 18, to which is attached on each side, inner and outer leaves 19 and 20, the former being lower and forming a ledge which is adapted to bear against the edge of the glass 17, part of the inner leaf overlying the margin of the glass and thus affording a means of sealing the joint against water which might fall upon the outer surface of the glass.

The outer leaf 20 overlaps the inner leaf and bears upon the surface of the glass as shown, thus affording additional means for keeping out wind and water. Between the supports 16 and the central web 18 are channels 21 which serve as a gutter for carrying off water which condenses within this space or which leaks into it past the leaves 19 and 20.

A second gutter 22 is provided at each side of the device which consists of a turned-up lip adapted to carry water which condenses on the under surface of the glass and which runs toward the glazing bar. In both cases, the bar is inclined so that the gutters 21 and 22 drain off any water collecting therein.

The soft metal member 14 is preferably made by an extrusion process so that the elements shown and described run continuously throughout its length. It is ordinarily boxed and shipped in proper lengths to the place where they are to be used, while the angle irons 10 and the flat bars 11 are bolted together at the factory and also shipped separately. The member 14 is placed over the bar 11, and the nuts 13 on bolts 12 are loosened to permit the flat bar 11 being raised slightly by any suitable tool. The sides of the member 14 are then pressed downward and inward so that the side lips 15 will enter between the flat bar 11 and the supporting member 10, after which the nuts 13 on bolts 12 are again tightened which securely holds the glazing member 14 in place. The glass is then set in place and the inner leaves 19 bent down around the edge and margin of the glass and pressed down by means of a suitable tool into contact with the glass. The outer leaves 20 are then similarly bent and pressed down, thereby making a substantially water-tight joint.

In Fig. 2 is shown a modified form of glazing bar having a T-bar 23 for the supporting member which is secured to the flat bar 11ª by means of bolts 12ª and nuts 13ª. It will be understood that the supporting member may be any convenient structural shape to which the flat bar may be secured, the two serving to hold the glazing member 14.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. A glazing bar comprising a flat bar, a supporting member, and a glazing member partially surrounding the flat bar and having lips firmly secured between said flat bar and supporting member, said glazing member having means for supporting a pane of glass and means for sealing said glass.

2. A glazing bar comprising a flat bar, a supporting member, a glazing member partially surrounding the flat bar and having lips extending between said flat bar and supporting member, and bolts securing said flat bar and supporting member together, said glazing member having means for supporting a pane of glass and means for sealing said glass.

3. A glazing bar comprising a flat bar, a supporting member, a glazing member partially surrounding the flat bar and having lips extending between said flat bar and supporting member, and bolts securing said flat bar and supporting member together, said glazing member having means for supporting a pane of glass and means for sealing said glass, said flat bar and the adjacent face of the supporting member being of substantially the same width.

4. In combination, a flat bar, a glazing member having lips adapted to be pressed about and beneath said bar, a supporting member, and bolts for securing said supporting member and flat bar together to grip said lips therebetween, said glazing member having means for supporting a pane of glass and means for sealing said pane of glass.

5. A glazing bar comprising a flat bar, a supporting member, and a glazing member partially surrounding the flat bar and having lips firmly secured between said flat bar and structural shape, said glazing member having means for supporting a pane of glass and means for sealing said glass.

ELMER L. NELSON.